United States Patent
Kolavennu et al.

(10) Patent No.: US 10,083,376 B2
(45) Date of Patent: Sep. 25, 2018

(54) HUMAN PRESENCE DETECTION IN A HOME SURVEILLANCE SYSTEM

(71) Applicant: Honeywell International Inc., Morris Plains, NJ (US)

(72) Inventors: Soumitri N. Kolavennu, Blaine, MN (US); Sharath Venkatesha, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 212 days.

(21) Appl. No.: 14/886,349

(22) Filed: Oct. 19, 2015

(65) Prior Publication Data

US 2017/0109613 A1   Apr. 20, 2017

(51) Int. Cl.
| | |
|---|---|
| *G06K 9/62* | (2006.01) |
| *G06K 9/00* | (2006.01) |
| *G06K 9/46* | (2006.01) |
| *G06T 7/00* | (2017.01) |
| *G06T 7/60* | (2017.01) |

(Continued)

(52) U.S. Cl.
CPC ....... *G06K 9/6267* (2013.01); *G06K 9/00362* (2013.01); *G06K 9/00771* (2013.01); *G06K 9/4604* (2013.01); *G06K 9/4642* (2013.01); *G06K 9/4661* (2013.01); *G06K 9/52* (2013.01); *G06K 9/6201* (2013.01); *G06K 9/6262* (2013.01); *G06T 7/13* (2017.01); *G06T 7/246* (2017.01); *G06T 7/60* (2013.01); *G06T 7/73* (2017.01); *G08B 13/19604* (2013.01); *H04N 7/18* (2013.01); *G06K 9/6253* (2013.01);

(Continued)

(58) Field of Classification Search
CPC ............... G06K 9/6267; G06K 9/4661; G06K 9/00771; G06K 9/6262; G06K 9/6201; G06K 9/52; G06K 9/4642; G06K 9/4604; G06K 9/00362; G06T 7/13; G06T 7/60; G06T 7/73; G06T 7/246; G08B 13/19604; H04N 7/18
See application file for complete search history.

(56) References Cited

U.S. PATENT DOCUMENTS

| 8,213,680 B2* | 7/2012 | Fitzgibbon | ......... G06K 9/00335 348/169 |
|---|---|---|---|
| 2006/0018516 A1* | 1/2006 | Masoud | ............. G06K 9/00342 382/115 |

(Continued)

OTHER PUBLICATIONS

Arturo (Sensors 2010,10(3), 2027-2044; doi: 10.3390/ s100302027 : Automatic Chessboard Detection for Intrinsic and Extrinsic Camera Parameter Calibration).*

(Continued)

*Primary Examiner* — Christopher S Kelley
*Assistant Examiner* — Nasim Nirjhar
(74) *Attorney, Agent, or Firm* — Schwegman Lundberg & Woessner, P.A.

(57) ABSTRACT

A surveillance system includes an image sensing device for capturing images of a plurality of moving objects at a plurality of different locations in a field of view of the image sensing device. The system also includes a user interactive processor for performing a human-distance calibration for a given location and position of the image sensing device. The system further includes a processor for detecting a human presence among the plurality of moving objects based on the human-distance calibration.

17 Claims, 6 Drawing Sheets

(51) Int. Cl.
*G06K 9/52* (2006.01)
*H04N 7/18* (2006.01)
*G06T 7/20* (2017.01)
*G08B 13/196* (2006.01)
*G06T 7/73* (2017.01)
*G06T 7/13* (2017.01)
*G06T 7/246* (2017.01)

(52) U.S. Cl.
CPC ............... *G06K 2009/4666* (2013.01); *G06T 2207/20081* (2013.01); *G06T 2207/30196* (2013.01)

(56) References Cited

U.S. PATENT DOCUMENTS

| | | | |
|---|---|---|---|
| 2007/0127774 A1 | 6/2007 | Zhang et al. | |
| 2010/0054540 A1* | 3/2010 | Brown | G06K 9/00369 382/107 |
| 2013/0182114 A1 | 7/2013 | Zhang et al. | |
| 2013/0251246 A1* | 9/2013 | Tang | G06K 9/6206 382/159 |
| 2014/0072170 A1* | 3/2014 | Zhang | G06K 9/00369 382/103 |
| 2014/0184765 A1* | 7/2014 | King | H04N 7/18 348/65 |
| 2014/0218195 A1 | 8/2014 | Buckley | |
| 2016/0239723 A1* | 8/2016 | Ge | G08B 13/19615 |

OTHER PUBLICATIONS

"European Application Serial No. 14886349, Extended European Search Report dated Jan. 30, 2017", 4 pgs.

"European Application Serial No. 14886349, European Office Action dated Feb. 24, 2017", 6 pgs.

"European Application Serial No. 14886349, Response filed Aug. 25, 2017 to European Office Action dated Feb. 24, 2017", 21 pgs.

* cited by examiner

HUMAN PRESENCE DETECTION IN A HOME SURVEILLANCE SYSTEM

TECHNICAL FIELD

The present disclosure relates to a system and method for detecting the presence of a human in a surveillance system.

BACKGROUND

The ability to detect a person in videos and video data has gained a good deal of importance in the last few years. This detection ability has applications in various fields, the most important of which is security and surveillance. Traditional security and/or surveillance systems are based on motion detection. Popular motion detection methods include passive infrared (PIR) detectors, ultrasound sensors, thermal imagers, and CMOS (complementary metal-oxide semiconductor) cameras. These methods rely on detection triggered by object movement in a scene, caused by humans, pets, vehicles, etc. CMOS camera-based systems offer some ability to differentiate between moving cars and humans, but the results are scene specific. That is, the extrinsic and intrinsic camera parameters have to be known in order to have reliable human detection.

The sensing of humans in video data is a challenging endeavor for a variety of reasons, and false alarms reduce the system reliability. Moving foliage, lighting variations, and shadows are some common causes of false detections. In an indoor home scenario, false alarms are triggered commonly by pets, window drape movement due to wind, or car or foliage movement outside a window that is within the field of view (FOV) of the camera. Furthermore, in a do-it-yourself (DIY) installation of a surveillance system, the extrinsic parameters of the video sensing device are unknown. In most cases, the camera is placed at a covert location, such as behind a flower vase, which may provide an incorrect view angle for human detection. Incorrect detection and frequent false alarms cause user frustration and low system confidence. Consequently, there is a need in security and/or surveillance systems to detect human presence with minimal false alarms, i.e. the system triggers only with the presence of a human in the FOV of the video sensing device and not due to other erroneous cases as previously described. Additionally, for a home security scenario, the detection method should provide near real-time results to alert the home owner and/or police so that appropriate actions can be taken.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment provides a solution wherein a home owner, business owner, or other person can train a CMOS (complementary metal-oxide semiconductor) camera-based home security system in a few simple steps to obtain human detection results with a high confidence level. A motion detection algorithm that is based on background subtraction is employed. The system then has the ability to perform foreground-background separation and identify a foreground object (that is, a moving object) as a binary blob under different lighting conditions in the area under surveillance. The size of the foreground blob (that is, the number of pixels in the blob or a bounding rectangle) provides an estimate of the size of the moving object, provided the distance of the moving object from the camera is available. Unfortunately, the distance is normally unknown. A solution is detailed herein wherein a user-interactive method performs a human-distance calibration for a given position of the camera. The system interacts with the user via voice commands (voice input and voice output) to assist the user in performing a series of actions. The different steps involved in distance calibration are as follows.

Figure 3:
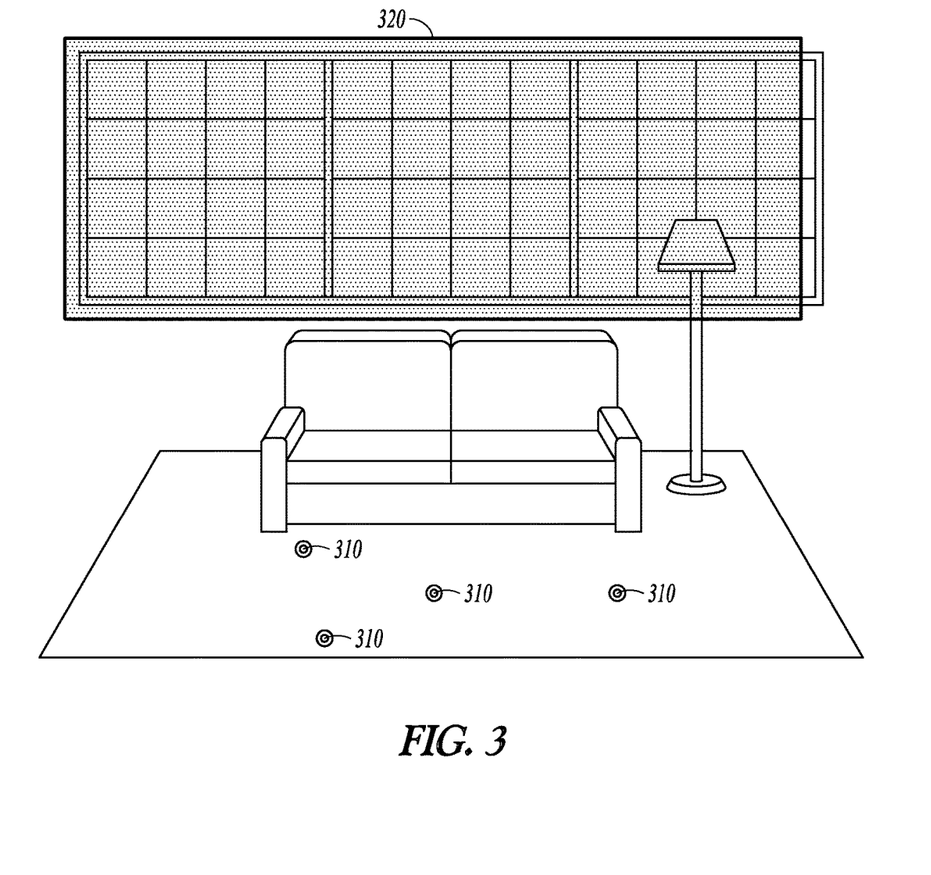
FIG. 3 illustrates an example calibration of a security and/or surveillance system by marking points on a ground plane.

A user sets up a camera or other image sensing device at a desired location such that the required area to be monitored is covered by the camera's field of view (FOV). A ground plane detection algorithm is run to detect the floor of the room in which the camera is installed (if the floor is visible in the camera's FOV). In the case wherein the camera fails to auto-detect the ground plane, the system presents to the user a captured image. The captured image could be accessed via a web or mobile interface provided to the user. If the camera field of view (FOV) covers the floor of the space under surveillance, the user then clicks (or selects) on different points on the floor, which mark the ground plane. If the floor is not visible in the camera's FOV, then this step can be skipped. In the scenario where a floor is visible in the camera FOV, an algorithm extracts the ground plane using a single captured image. Color and texture feature similarity is used to detect multiple 2D locations on the image corresponding to the floor. It is required to note that the extrinsic parameters of the camera, which are critical to estimate a 3D plane, are unknown. The camera thus applies an optimization algorithm (such a Markov Random Field) over a set of fitted 3D ground planes. Each of the detected 3D plane detection uses multiple 2D points on the floor (selected by random sampling consensus) and assumes certain extrinsic parameters in a valid range. A 3D plane thus selected will have the least error to the actual ground plane. Some of the details in the algorithm have been omitted for the sake of simplicity. Further, the detected ground plane is improved using the human blobs, as explained in the next section. See FIG. 3, No. 310. In an embodiment, at least 4 points are clicked on and marked by the user.

Figure 1:
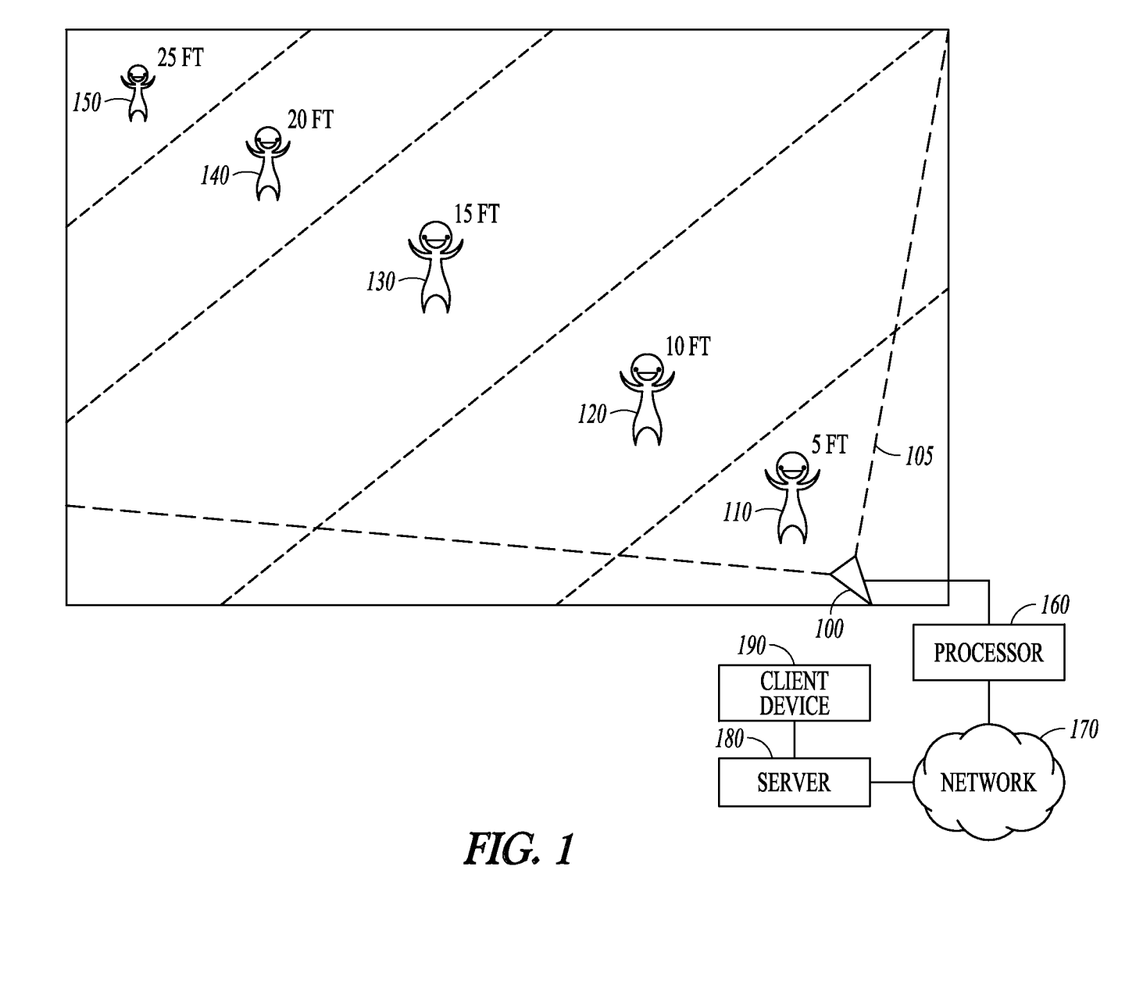
FIG. 1 illustrates an example calibration of a security and/or surveillance system.
Figure 2:
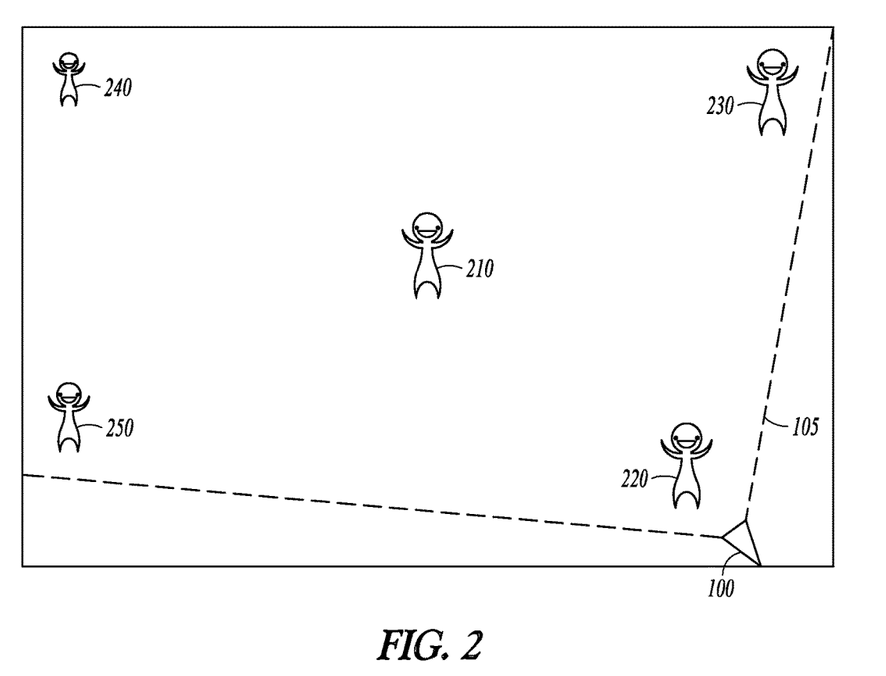
FIG. 2 illustrates another example calibration of a security and/or surveillance system.

The user then stands at multiple locations in the scene that are at different distances from the camera 100 and interacts with the camera system via voice commands to complete the human-distance calibration procedure. See FIG. 1 (110, 120, 130, 140, and 150) and FIG. 2 (210, 220, 230, 240, and 250). The camera captures images of the user at each location in its field of view (FOV) 105, performs a background subtraction, and estimates the foreground blob size corresponding to a human, at each particular distance. The user stands at different points on the periphery of the room, or at a set of approximate distances from the camera, for example 5, 10, 15, 20, and 25 feet as illustrated in FIG. 1. The camera system provides real time audio feedback to the user if they are outside the camera's field of view (FOV) 105. This interactive procedure also helps to capture images of the user along the periphery of the FOV. The system then builds a look up table (LUT) using the blob characteristics at different positions, the distance of the human from the camera and the ground plane information (if available). As noted below, the different blob characteristics (or features) calculated are size, statistical measures such as centroid, bounding box, major and minor axis, orientation, eccentricity, moments, etc. Other features estimated include shape and gradient descriptors. In a particular embodiment where the ground plane is present in the FOV, the system divides the ground plane into a grid and estimates (via interpolation) certain blob characteristics (such as the number of pixels that a human occupies), when such a human is present in a particular block of the grid at a particular distance from the camera. Higher detection accuracy can be achieved as the position of the blob touching the ground plane (that is, the position where the user is standing) helps to refine errors. In one such embodiment where the ground plane is not present in the FOV, the blob characteristics represent only a part of the human in the FOV (e.g., the lower torso may be outside the FOV). One or more images captured at each location are used.

Based on user settings for detection confidence, the user may be asked to capture images in different lighting conditions and/or poses such as sitting, squatting, bending down, stretching upwards, etc. The performance of the system can be further improved by accounting the variations due to different shapes and size of people, including children, by training the system with different sized persons. The LUT will be updated to contain the relevant information. Other variations to the above methodology can be assumed. In one such embodiment, the features corresponding to a human (obtained in the human-distance calibration phase) can be fed into a learning algorithm as positive samples to train a human detector. In an alternative embodiment, the blob characteristics are normalized by the distance at which the blob is captured. In a specific case, a weighted combination of multiple blob characteristics can result in a scalar value for a detected blob, which can be compared to stored values to detect a human presence. The human-distance calibration is repeated if the camera position is changed.

In a particular embodiment where a three dimensional ground plane is estimated in the human-distance calibration phase, the same can be improved subsequently during the regular system operation phase. On a successful human detection, the 2D coordinates corresponding to the feet of the person are projected on the 3D plane to estimate the distance (error metric). In an ideal scenario, the distance between the projected 2D point and plane should be zero, assuming that the human's feet are on the ground when captured. The error is noted for different locations in the room and a new 3D plane is estimated to minimize the overall error. The estimation procedure is usually performed on the server connected to the camera and will not affect the normal operations.

For a user who is less involved, the system can ask the user to enter the approximate dimensions of the room and/or the distance of a farthest static object in the camera's FOV so that the look up table can be built automatically. During real time system operation, for each detected motion blob, its size and location are checked against the look up table. A distance function defined for multiple blob characteristics estimates how similar a detected motion blob is to a reference motion blob corresponding to a human. A human presence will trigger the alarm, whereas a pet movement will not. Further, special zones in the FOV (for example, a door, a window, and/or regions where a person can be partially occluded) can be automatically identified or user marked. See FIG. 3, No. 320. The system estimates correction parameters when a person is located in these zones resulting in fewer false positives.

In an embodiment, the system can be applied to a DIY security camera. The camera can be connected to a cloud server 180 via a network 170, which receives images from the camera and executes the human detection algorithms. The security system notifies the user via an installed application on a smart phone, a PC/laptop, or other client device 190. The same client device 190 is also used to view the images from the camera for performing a human-distance calibration.

Figure 4A:
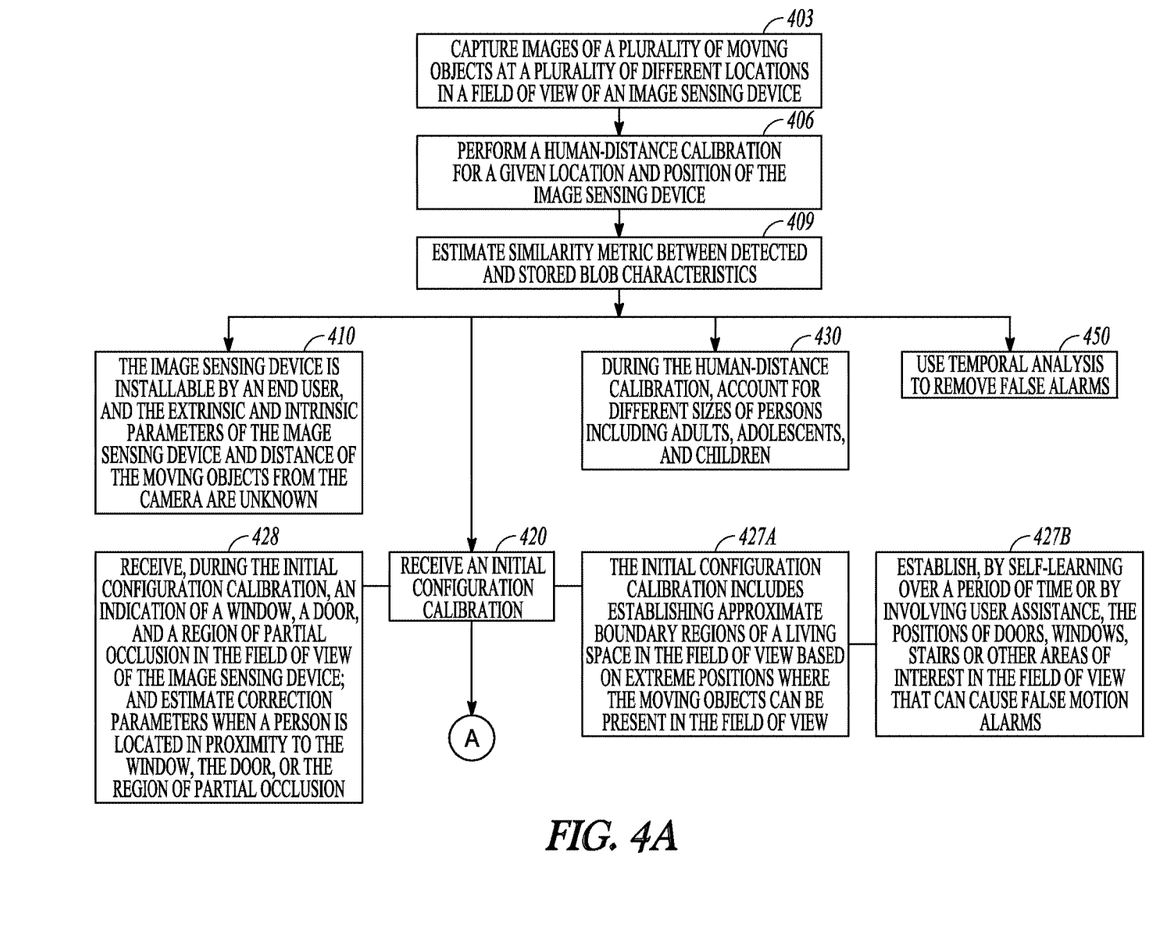
FIGS. 4A, 4B, and 4C are a block diagram illustrating features and operations of a security and/or surveillance system.
Figure 4B:
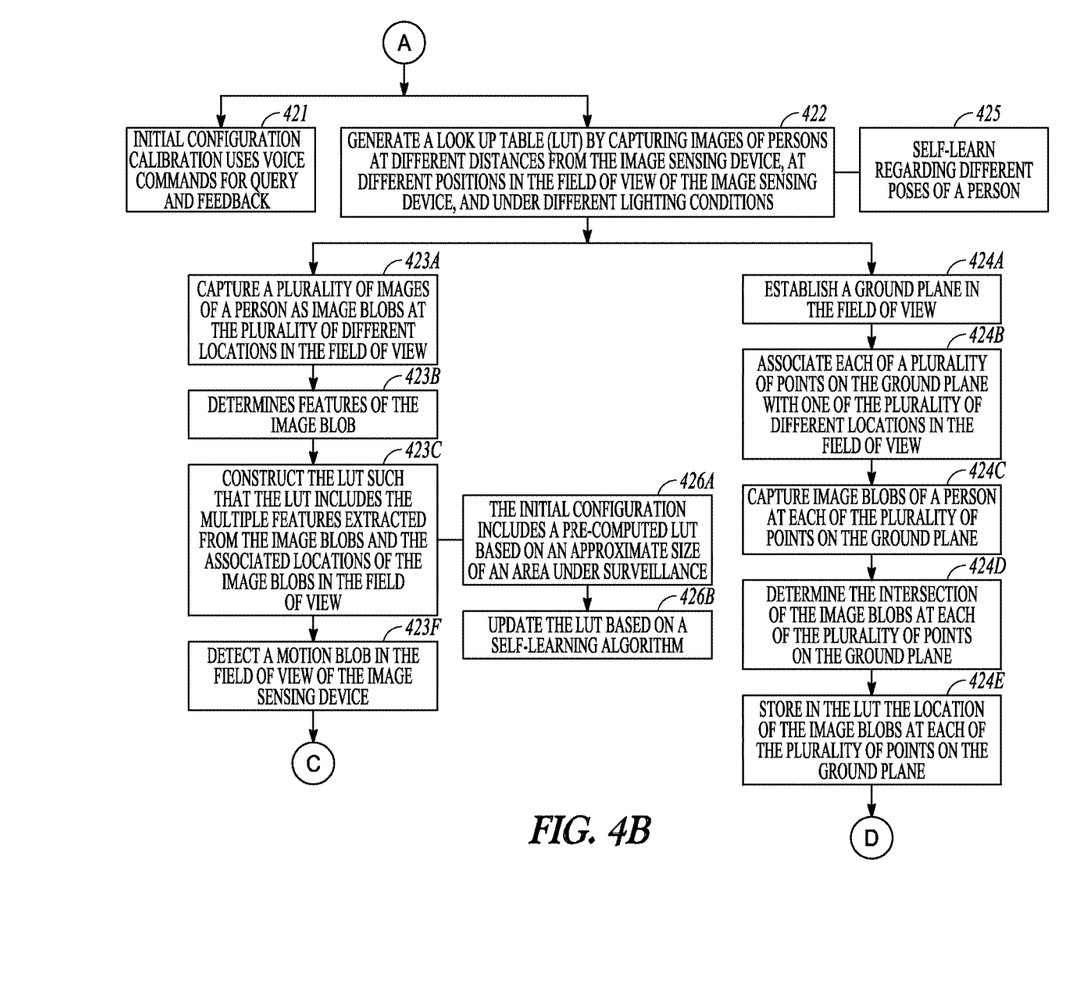
Figure 4C:
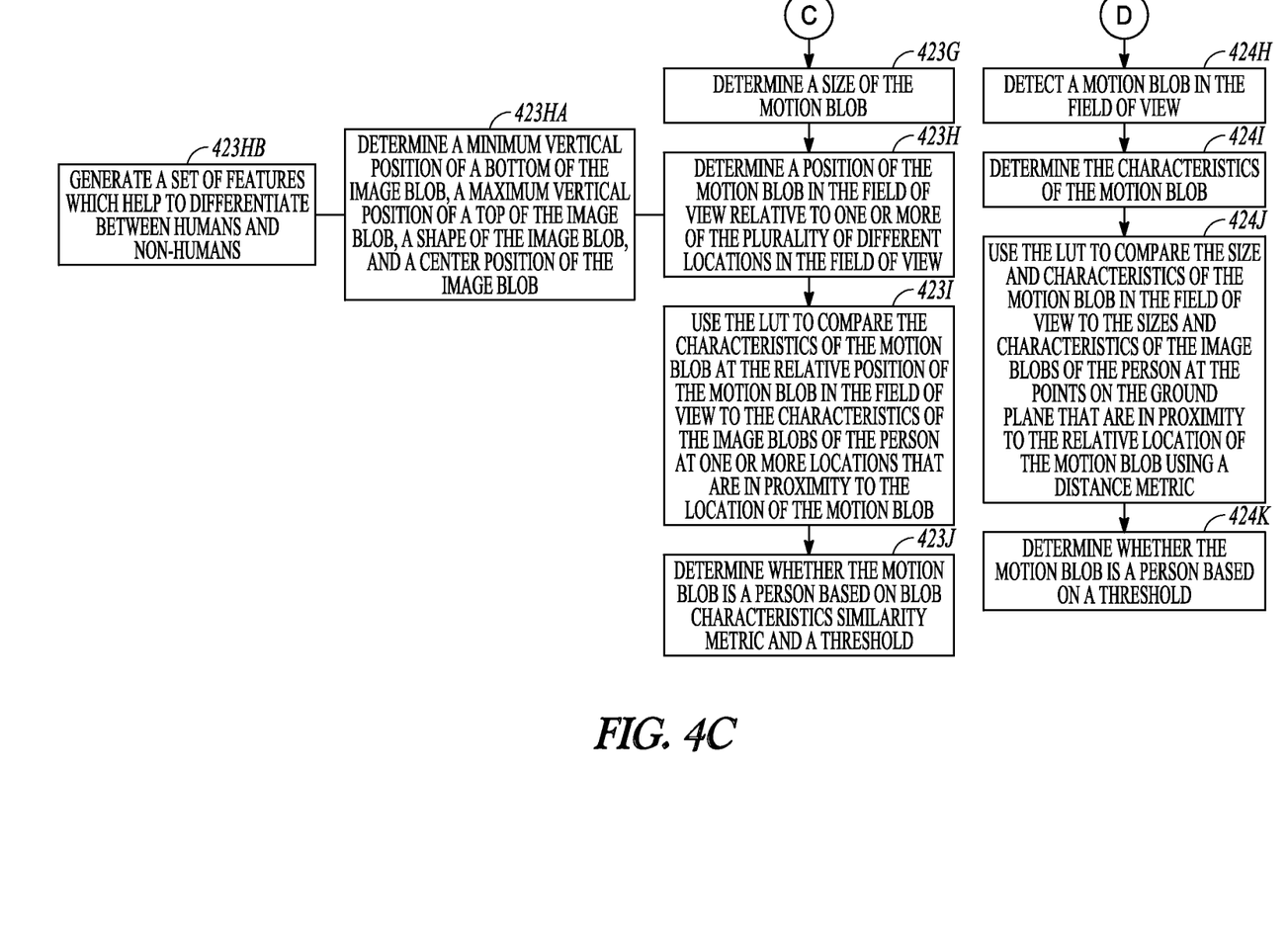

FIGS. 4A, 4B, and 4C are a block diagram illustrating operations and features of a security and/or surveillance system. FIGS. 4A, 4B, and 4C include a number of process blocks 405-450. Though arranged substantially serially in the example of FIGS. 4A, 4B, and 4C, other examples may reorder the blocks, omit one or more blocks, and/or execute two or more blocks in parallel using multiple processors or a single processor (160) organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 403, an image sensing device in a surveillance system captures images of a plurality of moving objects at a plurality of different locations in a field of view of the image sensing device. These moving objects could be humans, or they could be non-human moving objects such as pets, drapes, or moving objects outside that are seen through a window (such as an automobile). At 406, a user interactive computer processor performs a human-distance calibration for a given location and position of the image sensing device. That is, as explained in more detail below, the system is calibrated by positioning a camera, and capturing images of a person at a plurality of known distances and positions from the camera. As further explained in more detail below, characteristics of the captured person image (or blob) are stored in a look up table (LUT), which are thereafter used as a reference, to identify moving objects in the camera's field of view as human or non-human. At 409, a computer processor estimates the similarity metric between the detected and stored blob characteristics. Further, at 409, if determined that the similarity metric is above a defined threshold as set by a user confidence level, the system detects a human presence among the plurality of moving objects based on the human-distance calibration of operation 406.

As illustrated in block 410, the image sensing device is installable by an end user, and the extrinsic and intrinsic parameters of the image sensing device and distance of the moving objects from the camera are unknown. The import of this is that in an embodiment, the system is a do-it-yourself (DIY) type of system that a typical consumer can install and calibrate (or cause to be self-calibrated). The typical consumer does not know the intrinsic and extrinsic parameters of a camera, and may not take the effort to determine certain distances from the camera during the calibration of the camera.

Referring more specifically now to the calibration of the system, at 420, the system receives an initial configuration calibration via the user interactive processor. It is noted that this initial calibration is a calibration of the surveillance system, and further noted that the human distance calibration is independent of the camera calibration (since as noted above the intrinsic and extrinsic parameters of the camera are probably not known). Moreover, if the camera position and/or location is altered, the system must then be re-calibrated.

At 421, the user interactive processor receives a human voice and the initial configuration calibration uses voice commands for query and feedback. For example, if the system needs to know if a person is in a position in the field of view of the camera, and whether the system should capture an image blob of the person, the system can communicate this query to the user and receive a response from the user.

In conjunction with calibrating the system, at 422, the user interactive processor generates the look up table (LUT). The LUT is generated during the calibration phase by capturing images of persons at different distances from the image sensing device, at different positions in the field of view of the image sensing device, and under different lighting conditions. This LUT is used to positively identify whether a moving object in the field of view is a human as is explained in more detail below.

In an embodiment, the initial configuration includes several steps. At 423A, the system captures a plurality of images of a person as image blobs at the plurality of different locations in the field of view of the image sensing device. At 423B, the system determines features of the image blob. The different blob characteristics (or features) calculated are size, statistical measures such as centroid, bounding box, major and minor axis, orientation, eccentricity, moments, etc. Other features estimated include shape and gradient descriptors. These features are determined at each of the plurality of different locations in the field of view of the image sensing device. At 423C, the system constructs the LUT such that the LUT includes the multiple features extracted from the image blobs and the associated locations of the image blobs in the field of view.

After the initial calibration of the system in operations 423A, 423B, and 423C, the system can determine whether motion blobs in the field of view of the image sensing device are human or non-human. Specifically, at 423F, the system detects a motion blob in the field of view of the image sensing device. At 423G, the system determines a size of the motion blob, and at 423H, the system determines a position of the motion blob in the field of view of the image sensing device relative to one or more of the plurality of different locations in the field of view. At 423HA, the system determines a minimum vertical position of a bottom of the image blob, a maximum vertical position of a top of the image blob, a shape of the image blob, and a center position of the image blob. At 423HB, the system generates a set of features which help to differentiate between humans and non-humans. These features include 2D shape descriptors and histogram of oriented gradients calculated at a plurality of orientations for grayscale image pixels corresponding to the motion blob. Then, at 423I, the system uses the LUT to compare the characteristics of the motion blob in the field of view of the image sensing device to the characteristics of the reference image blobs of the person at one or more locations that are in proximity to the location of the motion blob. That is, if the motion blob is close to a particular ground point in the field of view of the image sensing device, then the features of the motion blob is compared to the features of the image blobs of the persons captured at that ground point during the training phase. The multiple blob characteristics estimated as such, may be weighted differently based on whether the floor area (detected ground plane) is in the camera FOV or not. At 423J, the system defines a similarity metric on the blob characteristics and a threshold, based on user based settings to determine whether the motion blob is a person.

In another embodiment, the initial calibration uses a ground plane. Specifically, at 424A, the system establishes a ground plane, if visible in the field of view of the image sensing device. At 424B, the system associates each of a plurality of points on the ground plane with one of the plurality of different locations in the field of view. At 424C, the system captures image blobs of a person at each of the plurality of points on the ground plane. At 424D, the system determines the intersection of the image blobs at each of the plurality of points on the ground plane, and at 424E, the system stores additional parameters in the LUT, which is the location of the image blobs at each of the plurality of points on the ground plane. This enables the system to get an estimate of the real world distance between the camera and human locations. Thereafter, the system can capture a motion blob, and determine whether the motion blob is a human or non-human in a fashion similar to operations 423F-423H as described above.

Specifically, at 424H, the system detects a motion blob in the field of view of the image sensing device. At 424I, the system determines the characteristics of the motion blob. At 424J, the system uses the LUT to compare the size and characteristics of the motion blob in the field of view to the sizes and characteristics of the image blobs of the person at one or more locations that are in proximity to the relative location of the motion blob, using a distance metric. After this comparison, at 424K, the system determines whether the motion blob is a person based on a threshold defined by user settings. Operation 424J can also be considered to capture the behavior of a machine learning algorithm (such as a support vector machine, neural network, adaboost or similar) where the blobs from the human-distance calibration phase are used as samples for training the human detector. The model thus built is applied in operation 424K to detect whether a motion blob is a human.

At 425, the system can also self-learn regarding different poses of a person such as sitting, squatting, bending down, stretching upwards, walking, crawling, and jumping. For example, if the system is initially trained to identify small children in addition to identifying adults, the system may learn over time that at times such small children go from an upright walking position to a crawling position or a sitting on the floor position. The system can then be programmed to respond in an appropriate manner, such as warning an adult that a child has entered a particular room and may need attention. The system stores such information into the LUT.

In an embodiment, at 426A, the initial configuration includes a pre-computed LUT based on an approximate size of an area under surveillance. The user can provide this information using the interactive processor. For example, if the area under surveillance is relatively small, then persons captured as motion blobs in the field of view of an image sensing device will have relatively minor variation in blob characteristics. The information corresponding to the characteristics of a human in the FOV can be pre-computed and pre-loaded into the LUT. Alternatively, if a learning algorithm is used, a model corresponding to the size of the room can be loaded to the camera. More specifically, at 426B, the system updates the LUT based on a self-learning algorithm, which uses features computed on the motion blobs of moving humans in the field of view. For example, a system can learn that a motion blob that is a human may extend an appendage as it approaches a certain portion of the field of view (to open a door for example). The generation of the pre-computed LUT and the self-learning algorithm can use approximate dimensions of a room and a distance of a farthest static object in the field of view of the image sensing device for automatically constructing the LUT based on the dimensions of the room or the size of the static object. The self-learning algorithm can also use information provided by the user, in case a false positive is detected by the system, to further improve the system performance.

At 427A, the initial configuration calibration comprises establishing approximate boundary regions of a living space in the field of view based on extreme positions where the moving objects can be present in the field of view. Then, at 427B, the system establishes, by self-learning over a period of time or by involving user assistance, the positions of doors, windows, stairs or other areas of interest in the field of view that can cause false motion alarms. For example, a door that is left open can be moved by air currents and generate a motion blob thereby causing a false alarm. Similarly, trees outside of a window can of course be blown by the wind, also creating a motion blob and a false alarm.

At 428, during the initial configuration calibration, an indication of a window, a door, and a region of partial occlusion in the field of view of the image sensing device is received, and correction parameters are estimated when a person is located in proximity to the window, the door, or the region of partial occlusion. The user is presented an image from the camera and requested to mark regions which can potentially cause false alarms. The marked regions correspond to regions of lower or zero confidence for human detection. During the detection phase, if a motion blob is detected completely within the marked regions, such a blob is ignored. The system demonstrates a different behavior when a detected motion blob partially overlaps a marked region, or appears to be larger in size compared to marked region (completely engulfs the marked region). The system then applies a rudimentary blob tracking algorithm across multiple frames, i.e., temporal, using the blob centroid to determine the confidence of human detection.

At 430, during the human-distance calibration, the system accounts for different sizes of persons including adults, adolescents, and children. This allows the system to learn about different types of persons, and to more robustly identify moving objects as persons notwithstanding the age or size of the person.

At 450, the system uses temporal analysis to remove false alarms. For example, if a person is tracked as a motion blob through a surveilled area, it can be predicted with some certainty when the motion blob should appear at a certain time in the near future. However, if the motion blob does not follow that tracking, or disappears as a motion blob (for example the wind stopped blowing a tree outside of a window), then the temporal analysis can conclude that the motion blob is not a person and label it as a false alarm.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A surveillance system comprising:
   an image sensing device for capturing images of a plurality of moving objects at a plurality of different locations in a field of view of the image sensing device;
   a user interactive processor for performing a human-distance calibration or a given location and position of the image sensing device; and
   a processor for detecting a human presence among the plurality of moving objects based on the human-distance calibration;
   wherein the system receives an initial configuration calibration via the user interactive processor;
   wherein the initial configuration calibration comprises a calibration of the surveillance system;
   wherein an output of the user interactive processor comprises a look up table (LUT) for detection of a human in a field of view of the image sensing device at different distances from the image sensing device, at different positions in the field of view, and under different lighting conditions; and
   wherein the initial configuration calibration comprises:
      establishing a ground plane in the field of view by running a ground plane detection algorithm, receiving a selection of a plurality of points on a floor thereby marking the ground plane, and using the selected points to generate a three-dimensional plane having a least error in relation to the ground plane;
      associating each of a plurality of points on the ground plane with one of the plurality of different locations in the field of view;
      capturing image blobs of a person at each of the plurality of points on the ground plane;
      determining a size of the image blobs at each of the plurality of points on the ground plane; and
      storing in the LUT the size of the image blobs at each of the plurality of points on the ground plane.

2. The surveillance system of claim 1, wherein the image sensing device is installable by an end user; and
   wherein extrinsic and intrinsic parameters of the image sensing device and distance of the moving objects from. the image sensing device are unknown.

3. The surveillance system of claim 1, wherein the user interactive processor receives a human voice and the initial configuration calibration uses voice commands for generating a query and providing feedback.

4. The surveillance system of claim 1, wherein the initial configuration calibration comprises:
  capturing a plurality of images of a person as image blobs at the plurality of different locations in the field of view of the image sensing device;
  determining image blob features including one or more of a size, a position relative to the field of view, a shape, a centroid of the blob, and a position of a top of the blob at each of the plurality of different locations; and
  constructing the LUT such that the LUT comprises multiple features extracted from the image blobs and associated locations of the image blobs in the field of view.

5. The surveillance system of claim 4, wherein the system:
  detects a motion blob in the field of view of the image sensing device;
  determines a size of the motion blob;
  determines a position of the motion blob in the field of view of the image sensing device relative to one or more of the plurality of different locations in the field of view;
  uses the LUT to compare the size of the motion blob at the relative position of the motion blob in the field of view to the sizes of the image blobs of the person at one or more locations that are in proximity to the location of the motion blob; and
  determines whether the motion blob is a person based on the comparison.

6. The surveillance system of claim 4, wherein the estimating multiple features of the image blobs comprises:
  determining a minimum vertical position of a bottom of the image blob, a maximum vertical position of a top of the image blob, a shape of the image blob, and a center position of the image blob; and
  generating a histogram of oriented gradients calculated at a plurality of orientations for grayscale image pixels corresponding to the motion blob.

7. The surveillance system of claim 6, wherein the system detects a motion blob in the field of view of the image sensing device;
  determines characteristics of the motion blob;
  uses the LUT to compare the size and characteristics of the motion blob at the relative position of the motion blob in the field of view to the sizes and characteristics of the image blobs of the person at one or more locations that are in proximity to the relative location of the motion blob; and
  determines whether the motion blob is a person based on the comparison.

8. The surveillance system of claim 1, wherein the system detects a motion blob in the field of view of the image sensing device;
  determines characteristics of the motion blob;
  uses the LUT to compare the size and characteristics of the motion blob at the relative position of the motion blob in the field of view to the sizes and characteristics of the image blobs of the person at the points on the ground plan that are in proximity to the relative location of the motion blob; and
  determines whether the motion blob is a person based on the comparison.

9. The surveillance system of claim 4, wherein the initial configuration comprises a pre-computed LUT based on an approximate size of an area under surveillance; and wherein the system updates the LUT based on a self-learning algorithm, which uses features computed on the motion blobs in the field of view.

10. The surveillance system of claim 1, comprising a processor for accounting for, during the human-distance calibration, different sizes of persons including adults, adolescents, and children.

11. The surveillance system of claim 1, comprising self-learning and updating the LUT based on the plurality of image blobs of the person in a plurality of poses including sitting, squatting, bending down, and stretching upwards.

12. The surveillance system of claim 1, wherein the initial configuration calibration comprises:
  establishing approximate boundary regions of a living space in the field of view based on extreme positions where the moving objects can be present in the field of view; and
  establishing, by self-learning over a period of time or by involving user assistance, positions of doors, windows, stairs or other areas of interest in the field of view that can cause false motion alarms.

13. The surveillance system of claim 1, comprising a computer processor for removing an effect of changes in lighting.

14. The surveillance system of claim 1, comprising a computer processor for using temporal analysis to remove false alarms.

15. The surveillance system of claim 1 comprising a computer processor for receiving, during the initial configuration calibration, an indication of a window, a door, and a region of partial occlusion in the field of view of the image sensing device; and
  for estimating correction parameters when a person is located in proximity to the window, the door, or the region of partial occlusion.

16. The surveillance system of claim 1, comprising a server coupled to the system via a network, the server operable for notifying a user of the human presence via an application on a mobile device.

17. A surveillance system comprising:
  an image sensing device for capturing images of a plurality of moving objects at a plurality of different locations in a field of view of the image sensing device;
  a user interactive processor for performing a human-distance calibration for a given location and position of the image sensing device; and
  a processor for detecting a human presence among the plurality of moving objects based on the human-distance calibration;
  wherein the system receives an initial configuration calibration via the user interactive processor; and
  wherein the initial configuration calibration comprises a calibration of the surveillance system;
  wherein an output of the user interactive processor comprises a look up table (LUT) for detection of a human in a field of view of the image sensing device at different distances from the image sensing device, at different positions in the field of view, and under different lighting conditions;
  wherein the initial configuration calibration comprises:
  establishing approximate boundary regions of a living space in the field of view based on extreme positions where the moving objects can be present in the field of view; and
  establishing, by self-learning over a period of time or by involving user assistance, positions of doors, windows, stairs or other areas of interest in the field of view that can cause false motion alarms; and wherein the performing the human-distance calibration comprises establishing a three-dimensional ground plane, and thereafter updating the three-dimensional ground plane during an operation phase by projecting two-dimensional coordinates of feet of a detected human onto the three dimensional ground plane to estimate a distance error metric, and estimating a new three-dimensional ground plane to minimize the error metric.

* * * * *